United States Patent Office 3,431,475
Patented Mar. 4, 1969

3,431,475
SOLID STATE SERVO SYSTEM INCLUDING A UNIQUE D.C. CONTROL TRIGGERING A.C. POWER TO THE SERVOMOTOR
Charles R. Wesner, Crozet, Va., assignor to Sperry Rand Corporation, a corporation of Delaware
Filed Aug. 18, 1965, Ser. No. 480,633
U.S. Cl. 318—18
Int. Cl. G05b 11/01; H02p 1/18, 1/54
4 Claims

ABSTRACT OF THE DISCLOSURE

An improved position servomechanism for a ship's steering system utilizing solid state switching to electrically isolate the A.C. power circuit from the D.C. control circuit is disclosed. The system is controlled by a D.C. bridge circuit with a variable sensitivity control. The D.C. error signal from the bridge is summed into a D.C. amplifier with a variable dead zone circuit and an optional rate network. The unique feature of this invention is the manner in which the amplified D.C. control signal is used to trigger the A.C. power to the servo motor.

The present invention relates to improvements in closed loop servo systems having solid state switching between a D.C. control circuit and an A.C. power or load circuit. The system has utility in moving a dirigible craft about an axis where for example the provided motive means is operatively connected to the rudder of the craft and the motive means is included in the power circuit.

The primary object of the present invention is to provide a system of the character described in which the D.C. control circuit is isolated electrically from the A.C. load circuit without requiring expensive power type isolation transformers or switching relays. As switches of the solid state type have a lower failure rate than the noted devices, the operational lifetime of the improved system is increased over presently known systems for moving a craft about an axis.

In accordance with one of the features of the present invention, the isolation is provided by respective solid state switches in the included power and isolation circuits where the gate of the switch of the power circuit is connected to the primary of a transformer, the gate of the isolation circuit switch is connected to the D.C. circuit, one of the elements of the isolation circuit switch is connected to the ends of the secondary winding of the transformer through respective rectifiers, and the other of the elements of the isolation circuit switch is connected at a center tap location to the secondary winding of the transformer.

A further feature of the invention is provided by the inclusion of a biasing weather adjustment in the control leg of the D.C. circuit providing an output depending on the displacement error of the craft from a reference condition with respect to the axis.

Still a further feature of the invention is provided by the inclusion of rudder ratio adjustment in the follow-up leg of the D.C. circuit providing an output with angular motion of the motive means from a null condition or the displacement of the rudder from a streamline condition.

Figure 1:
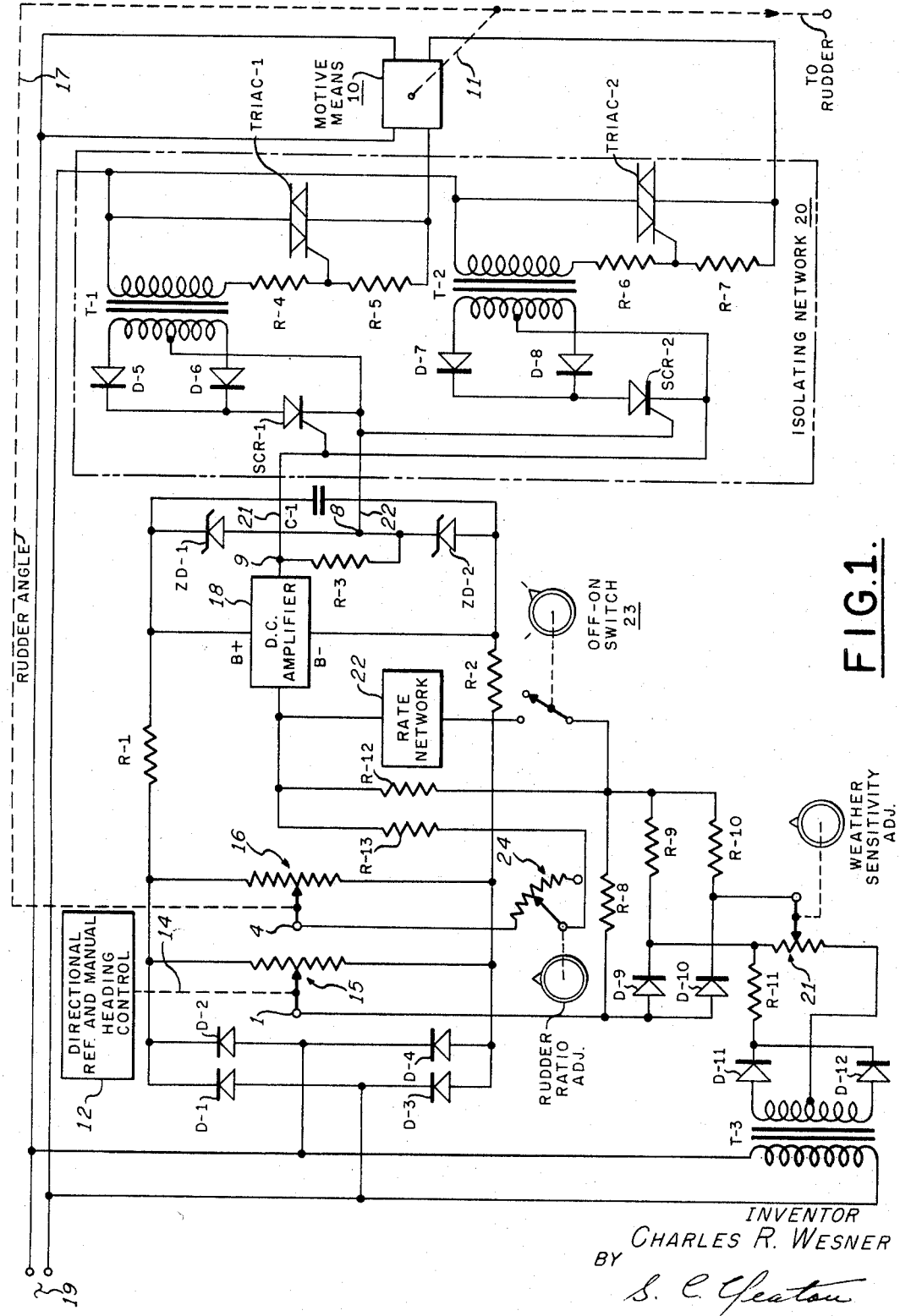
Figure 2:
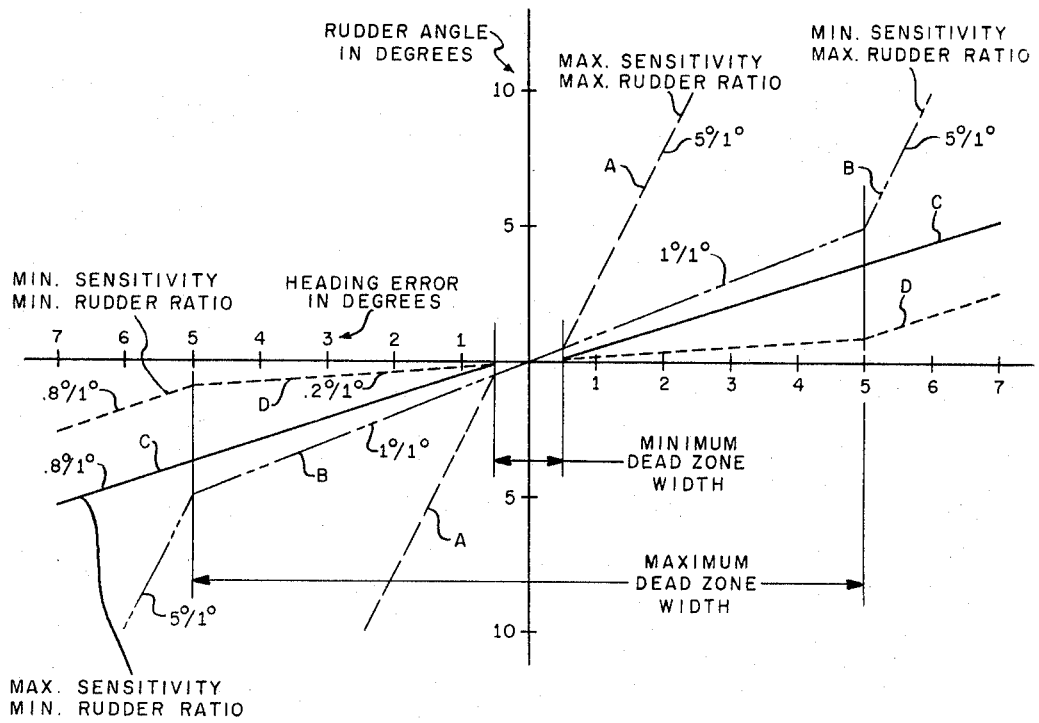

Other objects, features and structural details of the invention will be apparent from the following description when read in connection with the accompanying drawings in which:

FIG. 1 is a schematic view and wiring diagram showing a closed loop servo system embodying the present inventive concepts, and FIG. 2 is a graph showing four curves used in explanation of the operational range of the system with respect to the maximum weather sensitivity, maximum rudder ratio and minimum weather sensitivity, minimum rudder ratio adjustments.

For illustrative purposes, the improved servo loop is represented in FIG. 1 as including motive means 10 operatively connected by shafting 11 to the rudder of a dirigible craft to move it about an azimuth axis. Other conventional components of the improved system also include a combined directional reference and manual heading control 12 with a shaft 14 whose output represents heading error or the angular displacement of the craft from a reference heading. As shown shaft 14 is operatively connected to the slider of a potentiometer 15 in the control branch or leg of the D.C. circuit of the system. The output of the follow-up branch or leg of the considered D.C. circuit depends on the position of the rudder of the craft from a streamline condition in accordance with the position of the slider of a potentiometer 16. As indicated in FIG. 1, a shaft 17 reflecting the rudder angle of the craft connects the output shaft 11 with the slider of the potentiometer 16.

In the improved system, the polarity of the D.C. output from a D.C. amplifier 18 across terminals 8 and 9 determines the direction of operation of the motive means 10. Amplifier 18 is powered from resistors R–1, R–2, Zener diodes ZD–1, ZD–2 and filter condenser C–1 such that terminal 8 is a center tap on the D.C. supply provided by diodes D–1, D–2, D–3 and D–4 from an A.C. source of power 19, with a bridge formed with the heading angle potentiometer 15 and the rudder angle potentiometer 16. Heading error outputs of the D.C. circuit are determined by the potential across terminals 1 and 8. In operation a heading error output is cancelled by the motion of the rudder as the potentiometer 16 produces an output of opposite polarity across terminals 4 and 8 of the control circuit. In the improved system, resistor R–3 is between the output terminals 8 and 9 of the D.C. circuit and the output of the circuit depends on the relation of the heading of the craft with respect to a reference condition and the angular position of the rudder of the craft from streamline. When the craft is on heading with the rudder streamlined, the output of the D.C. circuit is null.

Motive means 10 in the A.C. power circuit of the system provides the means for moving the craft about its axis. To control the direction of operation of the means 10 connected to the rudder, the power circuit includes differential branches with respective solid state switches whose triggering is dependent on the polarity of the output of the D.C. control circuit at terminals 8, 9. As shown in FIG. 1, the load or power circuit of the system includes a first branch with a solid state switch indicated as a TRIAC–1 whose gate is connected to the source 19 by way of a triggering circuit that includes the primary of a first transformer T–1. Resistors R–4 and R–5 are included in the triggering circuit. The TRIAC–1 is a solid state switch developed by the General Electric Company that is similar in character to a silicon control rectifier. It has the further ability to carry current through the switch in either direction and can be gated by either polarity gate current. Corresponding components are included in the system for the second branch of the power circuit. These are indicated in FIG. 1 as a TRIAC–2, a transformer T–2, and resistors R–6, R–7.

The respective power and control circuits described are isolated from one another by means of a network 20 with circuits that includes solid state switches in the form of silicon control rectifiers SCR–1 and SCR–2. As shown in FIG. 1, the gate of the SCR–1 is connected by lead 21 to the terminal 9 and the gate of the SCR–2 is connected by lead 22 to the terminal 8. At the proper threshold output from the D.C. circuit, one of the solid state switches SCR–1 or SCR–2 is triggered depending on the polarity of the circuit. In accordance with the present invention, the network provided to energize the triggering circuit for the TRIAC–1 includes an isolating circuit with the secondary winding of the transformer T–1, the solid state switch SCR–1 with an element connected to the ends of the secondary winding of the transformer T–1 through respective rectifiers or diodes D–5, D–6 and an element connected at a center tap location to the secondary winding of the transformer T–1. The system operates with terminal 9 positive with respect to terminal 8 so that the rectifier SCR–1 is triggered and the transformer T–1 is shorted through the diodes D–5, D–6. The short circuited output of the primary winding of the transformer T–1 is limited by resistor R–4 to a value sufficient to trigger the TRIAC–1 each half cycle. With the TRIAC–1 triggered the full line voltage of the source 19 is available for the operation of the motive means 10. The operation of the means 10 in the reverse direction is effected when the polarity of terminal 8 is positive with respect to terminal 9 and the switch SCR–2 is triggered. Here, the other isolation circuit of the network 20 includes the SCR–2, a transformer T–2, and rectifiers or diodes D–7 and D–8 arranged as heretofore described for diodes D–5, D–6, the SCR–1 and the transformer T–1. Network 20 protects the system against line voltage transients, provides a switching of the reversible type with an off-center dead zone as indicated in FIG. 2 as well as isolation between the load and control circuits without large power handling isolating transformers being included therein.

In the control circuit between the terminal 1 and amplifier 18, the improved system includes means for providing an adjustable bias for the heading error output to change the sensitivity of the system. As shown in FIG. 1, this means includes a parallel arrangement with resistor R–8 of diodes D–9, D–10 and resistors R–9, R–10 having a cross connected potentiometer 21 whose slider is manually settable as a knob providing a weather sensitivity adjustment. Power for the biasing circuit is obtained from source 19 by way of transformer T–3, diodes D–11, D–12 and resistor R–11. A fixed resistor R–12 is also included in the control leg of the D.C. circuit of the improved system. This leg also includes a rate network 22 when an off-on switch 23 is closed to provide an output depending on the rate of change of the heading error.

The follow-up leg of the D.C. circuit further includes a potentiometer 24 between terminal 4 and amplifier 18. The slider of the potentiometer 24 is manually settable as a knob providing a rudder ratio adjustment. A fixed resistor R–13 is included in this leg of the D.C. circuit.

In the D.C. circuit, the weather sensitivity potentiometer 21 sets the bias voltage across the resistors R–9, R–10. The width of the dead zone shown in FIG. 2 is also dependent on the setting of the potentiometer 21. For heading errors within the dead zone with switch 23 in the off condition, rudder travel is determined by the resistors R–12, R–13, R–8 and the setting of potentiometer 24. For heading errors outside of the dead zone, rudder travel is determined by resistors R–12, R–13 and the setting of the potentiometer 24. When diodes D–9 and D–10 conduct, resistor R–8 is effectively shorted. The graph of FIG. 2 shows the relation between heading error in degrees and rudder angle in degrees with different adjustments of the potentiometers 21 and 24. Curve A indicates the operation of the system under conditions where the weather sensitivity and rudder ratio potentiometers are set for maximum rudder response. Here, the motive means 10 moves the rudder through 5 degrees from streamline for each degree of heading error of the craft after the minimum dead zone of ½° has been exceeded. For curve B in FIG. 2, the potentiometer 21 has been set for maximum weather adjustment without changing the setting of the potentiometer 24. Under this condition, the motion of the rudder has been reduced to 1 degree for each degree of heading error until the hearing error exceeds ±5°. For heading errors exceeding ±5°, the rudder travel is 5° for each degree heading error. Curve C indicates the condition where potentiometer 21 is set for maximum sensitivity and potentiometer 24 is set for minimum rudder travel. Here, the motion of the rudder relative to the heading error has been reduced to a maximum of $9/10$ of a degree per degree. Curve D in FIG. 2 indicates maximum weather adjustment (minimum sensitivity) and minimum rudder ratio. Here, the rudder is indicated as moving from streamline through $2/10$ of a degree for each degree of heading error until the dead zone of ±5° is exceeded and $9/10$ of a degree per degree thereafter. The slope of the curves A, B, C and D is determined by the setting of the rudder ratio potentiometer 24 of the improved system. The point at which each curve increases in slope is determined by the weather sensitivity potentiometer 21. Thus a fully adjustable, non-linear gain control system is provided in which gain limits can be manually selected and the operating gain is automatically determined by the amount of heading error.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a steering system for a navigable craft having a rudder, in combination:
   (a) servomotor means for operating said rudder;
   (b) an A.C. load circuit for controlling said servomotor means, said A.C. load circuit including a first branch with a solid state switch having a gate, a triggering circuit to the gate of said first branch including the primary winding of a first transformer; a second branch with a solid state switch having a gate, a triggering circuit to the gate of said second branch including the primary winding of a second transformer;
   (c) a first network for energizing the triggering circuit of said first branch, said first network having an isolating circuit including the secondary winding of the first transformer, a solid state switch with an element connected to the ends of the secondary winding of the first transformer through respective rectifiers and an element connected at a center tap location of the secondary winding of the first transformer, and a gate; a second network for energizing the triggering circuit of said second branch, said second network having an isolating circuit including the secondary winding of the second transformer, a solid state switch with an element connected to the ends of the secondary winding of the second transformer through respective rectifiers and an element connected at a center tap location of the secondary winding of the second transformer and a gate; and
   (d) a D.C. circuit connected differentially to the gates of the respective networks, said D.C. circuit having a control leg with an output depending on the displacement error of the craft from a reference heading and a follow-up leg with an output depending on the motion of the rudder from a null condition.

2. A system of the character claimed in claim 1, including adjustable means for biasing the error output of the control leg of the D.C. circuit to change the sensitivity of the moving means, and means for adjusting the output of the follow-up leg of the D.C. circuit.

3. A system of the character claimed in claim 2, in which the sensitivity of the moving means is non-linear and the sensitivity is determined by the magnitude of error in the control leg.

4. A system of the character claimed in claim 3, in which the control leg of the D.C. circuit includes a rate network.

References Cited

UNITED STATES PATENTS

| | | | |
|---|---|---|---|
| Re. 25,491 | 12/1963 | Lee et al. | 318 |
| 3,063,662 | 11/1962 | Rotier | 318 |
| 3,150,303 | 9/1964 | James et al. | 318 |
| 3,181,051 | 4/1965 | Marshall | 318—341 |
| 3,204,113 | 8/1965 | Snygg | 318 |
| 3,237,075 | 2/1966 | Sommeria | 318 |

ORIS L. RADER, *Primary Examiner.*

THOMAS E. LYNCH, *Assistant Examiner.*

U.S. Cl. X.R.

318—29, 207, 227, 448, 489